United States Patent

[11] 3,583,309

| [72] | Inventor | Robert G. Freidenrich |
| | | 525 E. 82nd St., New York, N.Y. 10028 |
| [21] | Appl. No. | 886,717 |
| [22] | Filed | Dec. 19, 1969 |
| [45] | Patented | June 8, 1971 |

[54] SMOKELESS COOKING STOVE
10 Claims, 4 Drawing Figs.

[52] U.S. Cl. ................................................. 99/445
[51] Int. Cl. ............................................ A47j 37/06
[50] Field of Search ....................................... 99/445,
339, 345, 421, 425, 446, 447, 450, 400; 126/9, 25

[56] References Cited
UNITED STATES PATENTS

| 347,822 | 8/1886 | Newell | 99/450X |
| 850,654 | 4/1907 | Jones | 99/445 |
| 1,510,547 | 10/1924 | Ferrari | 99/445 |
| 3,308,747 | 3/1967 | Spagnolo | 99/445X |
| 3,369,481 | 2/1968 | Pappas | 99/445 |
| 3,422,746 | 1/1969 | Sheinker | 99/445 |
| 3,443,510 | 5/1969 | Norton | 99/445 |
| 3,481,267 | 12/1969 | Saiki | 99/339 |

FOREIGN PATENTS

| 1,102,539 | 3/1961 | Germany | 99/445 |

Primary Examiner—Walter A. Scheel
Assistant Examiner—Arthur O. Henderson
Attorney—Pennie, Edmonds, Morton, Taylor and Adams ABSTRACT: A cooking stove of the type including a source of intense heat and a grill further includes a trap for collecting liquids which exude from food during cooking upon the grill, the trap being disposed intermediate the heat source and the grill to intercept exuded liquids before they contact the heat source while permitting exposure of the cooking food to the intense heat. The trap is constructed of a material having a mass insufficient to retain that amount of heat necessary to raise intercepted liquids to their respective smoking temperatures.

INVENTOR.
ROBERT G. FREIDENRICH
BY
Pennie, Edmonds, Morton, Taylor & Adams
ATTORNEYS

INVENTOR.
ROBERT G. FREIDENRICH

SMOKELESS COOKING STOVE

BACKGROUND OF THE INVENTION

This invention relates to cooking stoves and, more particularly, this invention relates to a novel structure for preventing smoking in cooking stoves, such as charcoal barbecues, which include a source of intense heat and a grill mounted adjacent to and above the heat source.

Standard charcoal cooking stoves comprise hot coals disposed in the bottom of a firepot and a grill for supporting cooking food mounted adjacent to and directly above the hot coals. Food such as meat when exposed to the intense heat for an extended period of time exudes fats and juices which fall onto the coals creating smoke and flames. Primarily because the generation of such smoke is intolerable indoors where ventilation presents a problem the use of charcoal cooking stoves has been limited to the outdoors. As a result, apartment dwellers heretofore have been unable to enjoy charcoal-broiled foods at home and even those having access to outdoor cooking facilities often find the weather to be a limiting factor.

Although prior grill constructions incidentally disclose means for drawing off exuded fats and juices before they impinge upon the heat source, such structures serve only to preserve the fats and juices for later use and are not suitable for preventing the generation of smoke. For example, in U.S. Pat. Nos. 3,973; 850,654; 1,510,547; and 2,940,381, the grills themselves are constructed only to prevent exuded liquids from falling upon the heat source. Such structures have the inherent disadvantage of requiring an inclined rather than horizontal grilling surface and do not prevent smoke because the liquids remain in contact with the hot, heavy guage grilling surface for a time sufficient to heat them to their respective smoking temperatures.

SUMMARY OF THE INVENTION

The present cooking stove includes a source of intense heat and a grill mounted adjacent to and above the heat source. A trap for collecting liquids which exude from food during cooking upon the grill is disposed intermediate the heat source and the grill. The trap comprises a plurality slats which are spaced apart and inclined with respect to the plane of the grill. The slats are arranged not only to intercept the exuded liquids before they contact the heat source but also to permit exposure of the cooking food to the intense heat. The slats are made of a material having a mass insufficient to retain that amount of heat which when transferred to the intercepted liquids would raise such liquids to their respective smoking temperatures. The lowermost marginal edge portion of each slat is an integral trough for collecting the intercepted exuded liquids and each trough is inclined to cause the collected liquids to flow off away from the heat source before they are raised to their respective smoking temperatures. Transverse members rigidly support the spaced-apart, inclined slats and means for receiving the exuded liquids from the collecting troughs are sufficiently insulated from the heat source to prevent the contained liquids from rising to their respective smoking temperatures.

The present cooking stove is particularly suitable for use when charcoal serves as the source of intense heat; however, the advantages of the present stove may also be achieved with other sources of intense heat which accomplish cooking primarily by radiation heat transfer. The present trap intercepts the exuded liquids before they fall upon the heat source while allowing the cooking food to be exposed to the radiated and convected heat. Most importantly, the present trap should be constructed of a material such as light gauge aluminum which has a low specific heat and a low density so that the mount of heat retained in the mass of each slat is less than that required to raise the exuded liquids to their smoking temperature before they can be drained off. Additionally, a polished aluminum surface generally exhibits low absorptance, a factor which further inhibits radiant heat transfer from the heat source to the trap. Accordingly, the cooking stove of the present invention makes available an economical broiling system which may be used indoors because it is substantially smoke-free.

DESCRIPTION OF THE PREFERRED EMBODIMENT

Figure 1:
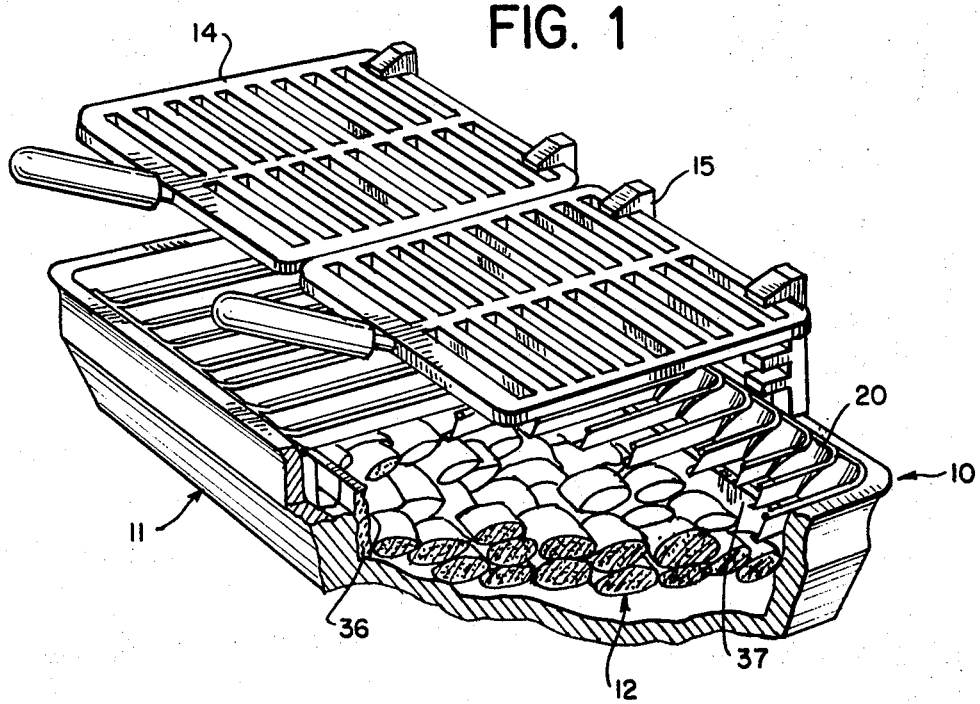
FIG. 1 is a perspective view in partial section of the present smokeless cooking stove.

A cooking stove 10 of the present invention comprises a firepot 11 in the lower portion of which a plurality of charcoal briquets 12 are disposed. The briquets 12, when ignited in the conventional manner, provide a source of intense heat suitable for cooking meats of all species as well as other foods.

A grill 14 is mounted adjacent to and above the heat source 12. In the present embodiment, the grill 14 is adjustably mounted on supports 15 which in turn are rigidly secured to a side of the firepot 11.

Figure 2:
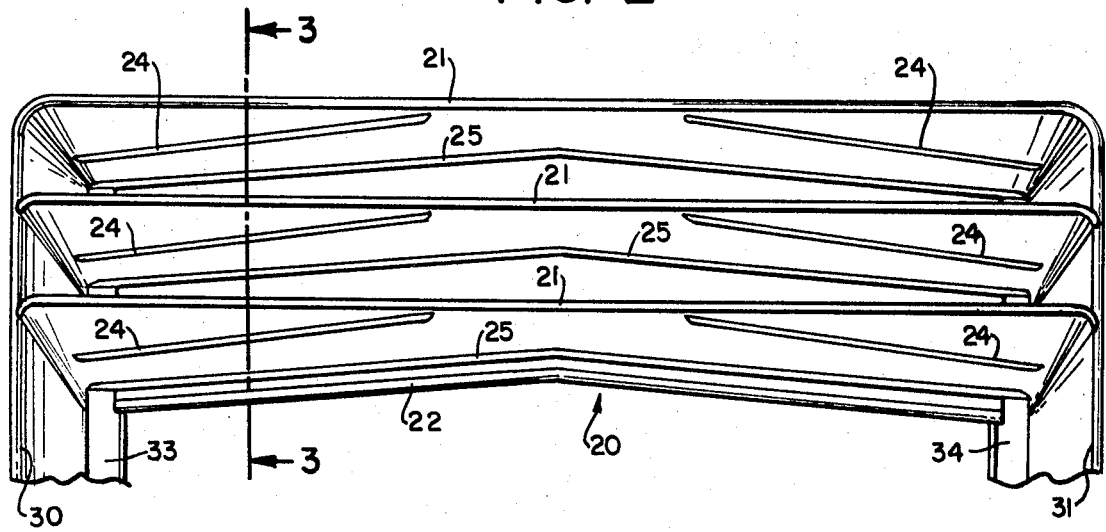
FIG. 2 is a plan view of the trap of the present smokeless cooking stove.
Figure 3:
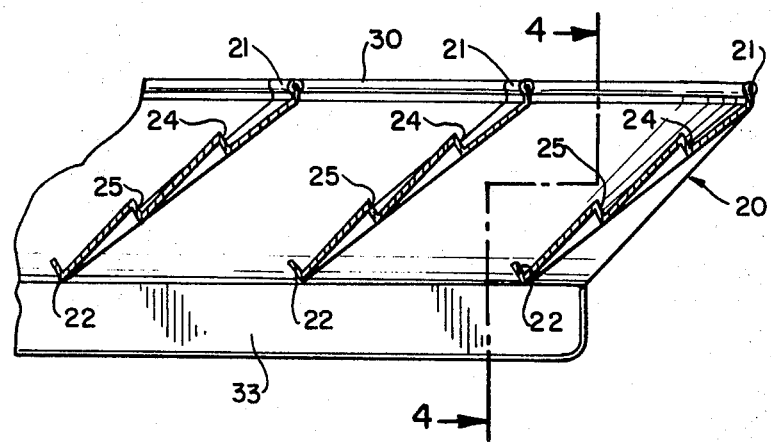
FIG. 3 is a sectional view taken substantially along line 3—3 of FIG. 2.
Figure 4:
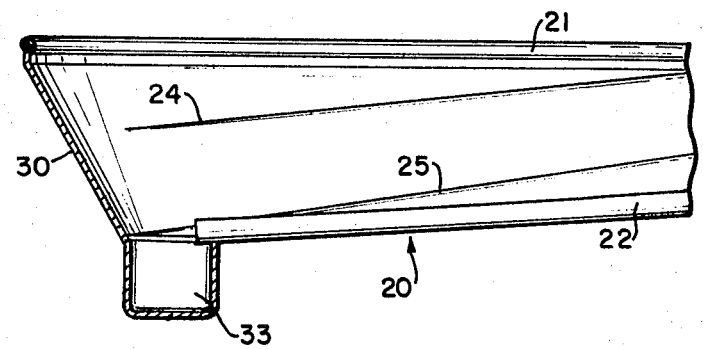
FIG. 4 is a sectional view taken substantially along line 4—4 of FIG. 3.

A trap 20 for collecting liquids such as fats and juices which exude from food during cooking upon the grill 14 is disposed intermediate the heat source 12 and the grill 14. Referring particularly to FIGS. 2—4, the trap 20 includes a plurality of parallel slats 21 which are spaced apart and inclined with respect to the plane of the grill 14. An integral trough portion 22 is formed at the lowermost marginal edge of each slat 21. Such troughs 22 serve to collect the liquids which are intercepted by the slats 21. Because the troughs 22 are inclined, the collected liquids flow off away from the heat source 12 before any of such liquids are raised to their respective smoking temperatures. Longitudinal inclined ribs 24, 25 may be provided on the surface of each slat 21 to aid in collecting the intercepted liquids and directing them away from the heat source 12. Any number of such ribs may be employed to achieve improved drainage.

Most importantly, the slats 21 are made from a material which has a mass insufficient to retain the amount of heat which when transferred to the intercepted liquids in contact with the slats 21 would raise such liquids to their respective smoking temperatures. In the type of cooking stove contemplated by the present invention, heat is transferred from the heat source to the food to be cooked primarily by radiation and convection rather than by conduction. In operation, the temperature of the slats 21 of the trap 20 rapidly assume the temperature of the ambient surroundings, but the amount of heat (B.T.U.'s) which the slats 21 retain at such temperature depends upon the mass and specific heat of the particular material of which the slats 21 are constructed. A relatively lightweight material which has a relatively low specific heat will not contain sufficient heat and will not have sufficient mass to effect the transfer by conduction of that amount of heat necessary to raise the intercepted liquids to their smoking temperature before they can be drawn off away from the heat source. For example, aluminum having a thickness not greater than about one thirty-second inch is particularly suitable as a slat material because it has the required physical properties in addition to being economical. Aluminum is a particularly suitable material because its characteristic highly polished reflective surface results in low absorptance of radiant energy. This feature further inhibits radiant heat transfer from the heat source 12 to the trap 20.

Transverse members 30, 31 rigidly support the spaced-apart, inclined slats 21 and, in the present embodiment, means for receiving the exuded liquids from the collecting troughs 22 and from the longitudinal, inclined ribs 24, 25 are well portions 33, 34 which are integral with the respective transverse members 30, 31. In order to prevent the contained liquids from rising to their smoking temperature, the receiving means or well portions 33, 34 are thermally insulated from the heat source 12. In the stove 10 of the present embodiment, insulation is achieved by providing thermal shields 36, 37 on opposite inside walls of the firepot 11. As shown in FIG. 1, the shields 36, 37 are configured to provide pockets which receive the transverse members 30, 31 of the trap 20. The thermal shields 36, 37 of the present embodiment also serve to support the trap 20 in position intermediate the heat source 12 and the grill 14.

I claim:

1. In a cooking stove of the type including a source of intense heat and a grill mounted adjacent to and above the heat source, the improvement in combination therewith comprising a trap for collecting liquids which exude from food during cooking upon the grill, the trap being disposed intermediate the heat source and the grill and including:
   a. a plurality of parallel slats, the slats being spaced apart and inclined with respect to the plane of the grill to intercept the exuded liquids before they contact the heat source and to permit exposure of the cooking food to the intense heat; the slats being made of a material having a mass insufficient to retain that amount of heat which when transferred to the intercepted liquids on contact with the slats would raise the liquids to their respective smoking temperatures; the lowermost marginal edge portion of each slat being an integral trough for collecting the intercepted exuded liquids, each trough being inclined to cause the collected liquids to flow off away from the heat source before the collected liquids are raised to their respective smoking temperatures;
   b. transverse members for rigidly supporting the spaced-apart, inclined slats; and
   c. means for receiving the exuded liquids from the collecting troughs, the receiving means being sufficiently insulated from the heat source to prevent the container liquids from rising to their respective smoking temperatures.

2. A cooking stove according to claim 1 wherein the slats are made of a polished material to inhibit transfer of heat by radiation from the heat source to the trap.

3. A cooking stove according to claim 2 wherein the slats are made of aluminum.

4. A cooking stove according to claim 3 wherein the aluminum slats are less than about one thirty-second inch in thickness.

5. A cooking stove according to claim 1 wherein the means for receiving exuded liquids from the collecting troughs are integral with the transverse support members.

6. A cooking stove according to claim 5 wherein the transverse support members have integral well portions which receive exuded liquids from the collecting troughs.

7. A cooking stove according to claim 1 wherein each slat includes at least one longitudinal inclined rib to aid in collecting intercepted liquids and directing them toward the receiving means.

8. A cooking stove according to claim 1 wherein the source of intense heat is a plurality of charcoal briquets disposed in a firepot and wherein the grill and the trap are mounted on the firepot.

9. A cooking stove according to claim 8 wherein the firepot includes means for insulating the liquid receiving means for the heat source.

10. For use in a cooking stove of the type including a source of intense heat and a grill mounted adjacent to and above the heat source, a trap for collecting liquids which exude from food during cooking upon the grill and being adapted for disposition intermediate the heat source and the grill comprising:
   a. a plurality of parallel slats, the slats being spaced-apart and inclined with respect to the plane of the grill to intercept the exuded liquids before they contact the heat source and to permit exposure of the cooking food to the intense heat; the slats being made of a material having a mass insufficient to retain that amount of heat which when transferred to the intercepted liquids in contact with the slats would raise the liquids to their respective smoking temperatures; the lowermost marginal edge portion of each slat being an integral trough for collecting the intercepted exuded liquids, each trough being inclined to cause the collected liquids to flow off away from the heat source before the collected liquids are raised to their respective smoking temperatures;
   b. transverse members for rigidly supporting the spaced-apart, inclined slats; and
   c. means for receiving the exuded liquids from the collecting troughs, the receiving means being sufficiently insulated from the heat source to prevent the contained liquids from rising to their respective smoking temperatures.